(12) United States Patent
Ellis et al.

(10) Patent No.: US 6,215,570 B1
(45) Date of Patent: Apr. 10, 2001

(54) OPTICAL SWITCH

(75) Inventors: Andrew David Ellis, Ipswich; David Michael Spirit, Woodbridge; David Arthur Owen Davies, GT Finborough, all of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/440,870

(22) Filed: Nov. 16, 1999

Related U.S. Application Data

(62) Division of application No. 08/817,118, filed as application No. PCT/GB96/01197 on May 20, 1996, now Pat. No. 6,091,524.

(30) Foreign Application Priority Data

May 22, 1995 (EP) .................................................. 95303469

(51) Int. Cl.[7] .................................................. H04B 10/12
(52) U.S. Cl. ............................................ 359/158; 359/326
(58) Field of Search ................................. 359/140, 133, 359/158

(56) References Cited

U.S. PATENT DOCUMENTS

| 4,091,290 | * | 5/1978 | Bjorklund et al. | 359/227 |
|---|---|---|---|---|
| 5,325,222 | * | 6/1994 | Jacob et al. | 359/140 |
| 5,508,835 | * | 4/1996 | Takahashi et al. | 359/140 |
| 5,535,032 | * | 7/1996 | Bottle | 359/140 |
| 5,555,119 | * | 9/1996 | Lewis | 359/158 |
| 5,612,805 | | 3/1997 | Fevier et al. | 359/124 |
| 5,742,415 | | 4/1998 | Manning et al. | 359/128 |
| 5,754,714 | | 5/1998 | Suzuki et al. | 385/5 |

FOREIGN PATENT DOCUMENTS 0 541 300   5/1993 (EP) .
0 637 182   2/1995 (EP) .

OTHER PUBLICATIONS

Summerfield et al., "All–Optical TDM to WDM Conversion in a Semiconductor Optical Amplifier", Electronics Letters, vol. 30, No. 3, Feb. 1994, pp. 255–256.
Patrick et al., "Bit–rate Flexible All–Optical De–Multiplexing Using a Nonlinear Optical Loop Mirror", Proceedings of the 19th European Conference on Optical Communication, vol. 2, Sep. 1993, pp. 281–284.
Morioka et al., "All–Optical Kerr Switching Techniques and Applications", IEEE Global Telecommunications Conference & Exhibition, vol. 2, Dec. 1990, pp. 1311–1317.
Blow et al., "Nonlinear Loop Mirrors for All Optical Switching", OSA Proceedings on Photonics in Switching, vol. 16, Mar. 1993, pp. 203–206.
Alexander et al., "A Precompetitive Consortium on Wide–Band All–Optical Networks", Journal of Lightwave Technology, vol. 11, No. 5/6, May 1993, pp. 714–732.
Jinno et al., "Nonlinear Sagnac Interferometer Switch and its Applications", IEEE Journal of Quantum Electronics, vol. 28, No. 4, Apr. 1992, pp. 875–882.

* cited by examiner

*Primary Examiner*—Leslie Pascal
(74) *Attorney, Agent, or Firm*—Nixon & Vanderhye P.C.

(57) ABSTRACT

Optical signals used for telecommunications in time division multiplexed format are processed to remove channels for local demodulation and to replace the removed channels with locally modulated data. The received signals are subjected to a wavelength modulation so that signals in selected channels are given distinctive wavelengths. After wavelength modulation, the time division multiplexed signals are separated using wavelength sensitive splitters and the various channels are sent to their correct destinations. In one embodiment, one channel is selected and given a distinctive wavelength and all the non-selected channels retain their original wavelength. The channels with the original wavelength are provided to an output terminal for onward transmission whereas the selected channel is provided for local demodulation.

1 Claim, 4 Drawing Sheets

OPTICAL SWITCH

This application is a divisional of application Ser. No. 08/817,118, filed Apr. 8, 1997 now U.S. Pat. No. 6,0991,524, which itself is the national stage of PCT/GB96/01197, filed May 20, 1996.

BACKGROUND OF THE INVENTION

This invention relates to the handling of optical telecommunications signals in digital form. More particularly it is concerned with optical signals in a time division multiplex format and on the separation of channels for supply to different terminal equipment. In many cases, one channel is removed and replaced by a new signal.

Optical telecommunication is particularly attractive because of the high speed of optical systems. In fact, optical systems have developed to the stage where it is difficult, sometimes impossible, to design electrical or electronic circuitry which is capable of matching the operating speeds of the fastest optical systems. In such fast systems it is appropriate or necessary that the signal processing be carried out by all optical equipment.

As mentioned above, this invention is particularly concerned with optical signals in time division multiplexed format. In such a format it is possible that each individual channel may be slow enough for processing in high speed electronic equipment but the multiplex may be too fast. For example, if four channels are multiplexed the bit rate of the multiplex will be four times the bit rate of each individual channel. Thus if each channel is operating at only 75% of the maximum speed available electronically the multiplex will be operating at 3 times the limit. In such a system it is clearly necessary that the multiplex be handled optically whereas the individual channels can be processed electronically.

It is appropriate to distinguish between two versions of time division multiplex format. These two versions are conveniently designated as "byte interleaved" and "bit interleaved". The byte interleaved format is more familiar than the bit interleaved. Each "byte" comprises a plurality of bits, usually 8, and the byte represents a unit of transmission. In the case of digitised analogue signals, e.g. digitised audio or digitised video, each byte represents a single sample of the analogue signal. In the case of data transmission each byte usually represents a single symbol of the data, e.g. an alphanumeric character. In the byte interleaved version of time division multiplex format each slot of the multiplex relates to its own channel and it contains one byte relating to that channel.

The bit interleaved version of the time division multiplexed format is less familiar and each slot contains only one bit. The signals will normally consist of bytes as described above but each byte is spread over a plurality of slots (instead of the more usual version wherein the whole byte is contained in one slot). As mentioned above, a byte usually consists of 8 bits and, therefore, in bit interleaved format such a byte is spread over 8 slots.

"Electronic Letters" 30 (1994) 3rd February 1994 at pages 255 and 256 describes a laboratory experiment which demonstrated an all-optical time division multiplex to wavelength division multiplex conversion using four wave mixing in a semiconductor optical amplifier. The discussion is limited to demultiplexing and nothing is said about the removal and replacement of a channel.

SUMMARY OF THE INVENTION

This invention relates to techniques for the handling of high speed optical telecommunications signals.

This invention, which is more fully defined in the claims, relates to
 (a) optical switching means for separating channels from optical signals in time division multiplex format, and replacing the removed channels by new signals modulated with local data,
 (b) telecommunications stations which include the switching means, and
 (c) telecommunications systems which include the stations.

The invention also includes methods of handling optical telecommunications signals in time divisional multiplex format.

The invention is based upon applying wavelength modulation to optical signals which are already modulated with data in a time division multiplex format. The modulation applies characteristic wavelengths to different channels of the multiplex. For example, to achieve the separation a primary wavelength is applied to all channels except selected channels and a complementary wavelength is applied to the selected channels. Having applied the wavelength modulation, the channels are separated by a suitable network of wavelength selective splitters so that signals having the primary wavelength go to one port and signals with the complementary wavelength go to a different port. This achieves the separation and the separated signals can, if desired, be converted into electrical form for further processing. The replacement is achieved by generating new signals at the primary wavelength in synchronisation with received time division multiplex. The wavelength selective splitters provide the new signals to the correct output terminal with appropriate synchronisation.

In preferred embodiments of the invention the wavelength modulation is achieved utilising clock signals generated in synchronisation with the received time division multiplex. The clock signals includes the wavelength modulation which defines the intended separation of the time division multiplex signals. The clock signals and the time division multiplex are combined preferably using an optical AND-gate. (An optical AND-gate has two input terminals, i.e. one for the time division multiplex and one for the clocks signals. The AND-gate produces an output signal when both of its inputs receive a signal. When an output is produced the output has the same wavelength as the clock signal. It will be appreciated that an AND-gate of this nature makes the appropriate combination of wavelength and data modulation).

This invention is particularly suitable for use in conjunction with signals which have a pulsed waveform. That is to say each timeslot potentially (depending on the data modulation) contains a signal pulse which has a low, preferably zero, intensity at the beginning of the slot. The intensity rises to a maximum within the slot, preferably at the middle of the slot, and then the intensity becomes low, preferably zero, at the end of the slot. It is emphasised that, in real transmissions, timing is unlikely to be prefect and the timing imperfections are often designated as "jitter". It is emphasised that while it is desirable to make the timing as accurate as possible satisfactory communication is maintained provided that the intensities at the beginning and end of slots are sufficiently low and the intensities in the middle of the slots are sufficiently high.

Both the time division multiplex signals and the clock signals have the same basic pulsed waveform but the nature of the modulation is different in each case. In the case of the traffic signals all the pulses have the same wavelength and the modulation takes the form of the presence and absence of pulses. The presence of a pulses usually indicates a logical "one" and in that case the slot contains a pulse as described. Other slots relate to a logical "zero" and in this case there is no pulse in the relevant slot, e.g. the intensity remains low, (preferably zero) throughout the slot. In the case of clock signals there is a pulse as described in every time slot but the pulses have different wavelengths to define the destination of signals in that particular slot. Because a clock signal is separately generated at each location the clock signals should be subject to less jitter than the traffic signals.

With pulsed signals as described the function of the AND-gate can be defined as follows. When a pulse is received at both terminals the clock pulse is transmitted so that the output has the same wavelength as the clock pulse. When a clock pulse is received in the absence of a traffic pulse the AND-gate has no output and nothing is transmitted. (The possibility that there is no clock pulse need not be considered since there is a clock pulse in every timeslot).

The AND-gate is conveniently implemented as a loop mirror which contains a semi-conductor amplifier located therein preferably symmetrically. A loop mirror involves a waveguide which is fed from both ends simultaneously so that it contains counter propagating pulses. More specifically the loop mirror is fed by means of a splitter. The splitter receives a single pulse which is divided into two, preferably equal, pulses which are fed to opposite ends of the waveguide. In the simple case the loop is symmetrical and it has the effect that pulses received at the splitter are returned from whence they came, i.e. the device acts as a reflector or mirror. It is possible to place a semi-conductor amplifier within the loop without disturbing the symmetry and the loop will still act as a mirror. To make a loop serve as an AND-gate the clock pulses are fed to the splitter. The symmetry of the mirror can be modified by providing the traffic pulses to the semiconductor amplifier. When a traffic pulses passes through the amplifier, the symmetry is disturbed and the result is that clock pulses are transmitted. It can therefore be seen that the modified loop mirror functions as the required AND-gate.

The clock signals are conveniently generated from lasers which operate at the frame rate. As has been explained above, the frame rate is low enough for electrical control. Thus each laser initially produces one pulse per frame and these pulse are passively divided to give one pulses per slot for each laser. The use of differential delay lines times the individual pulses so that there is one pulse per slot. It is convenient to use synchronised lasers for the various wavelengths needed in the system.

BRIEF DESCRIPTION OF THE DRAWINGS

The invention will now be described with reference to the accompanying drawings in which.

DETAILED DESCRIPTION

Figure 1:
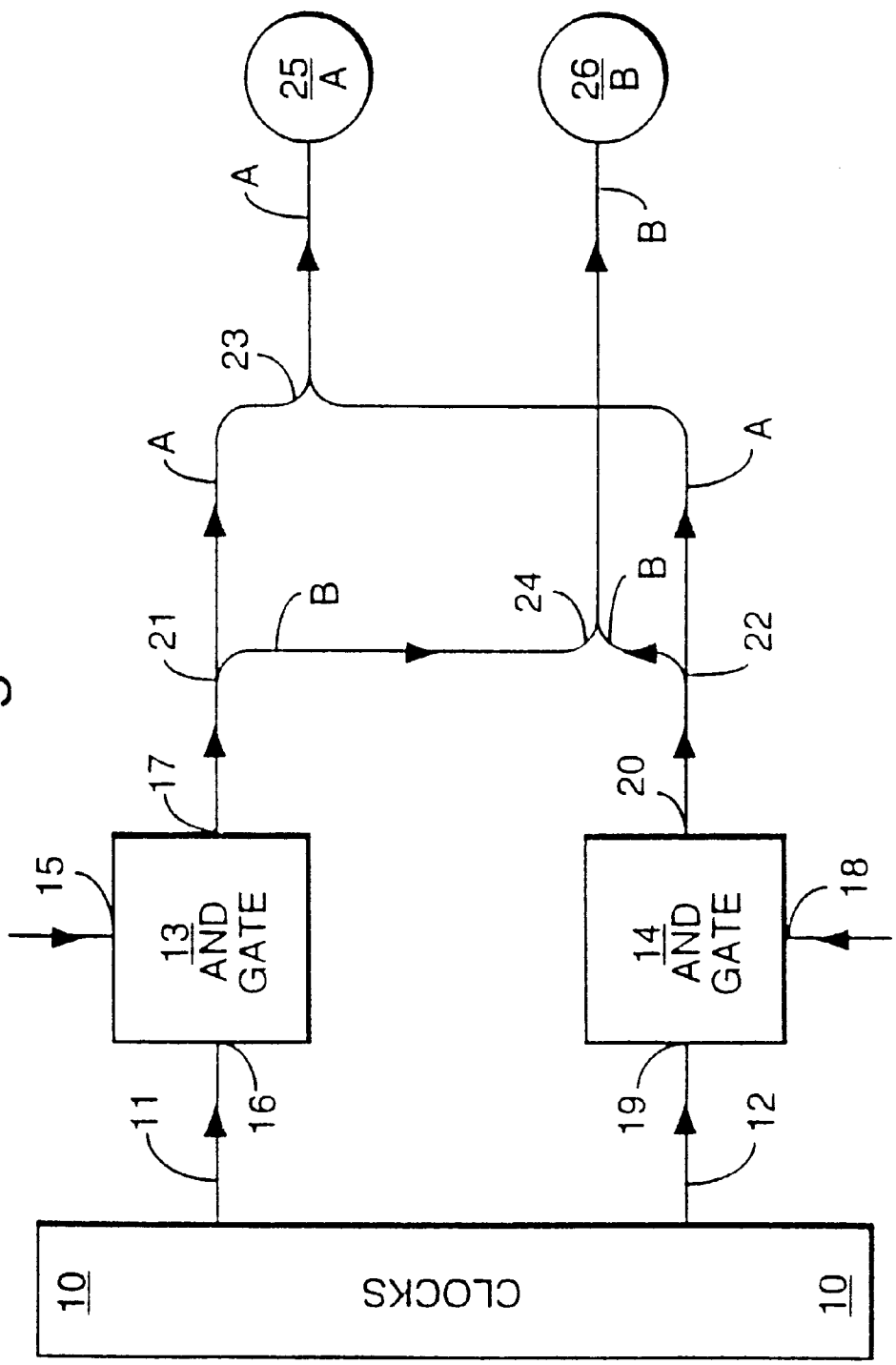
FIG. 1 is a diagram illustrating a first embodiment of the invention.

FIG. 1 illustrates a generalised form of the invention which is adapted to receive two distinct optical traffic streams each of which is in time division multiplex format. For this description it will be assumed that there are four channels in each of the traffic streams; i.e. each multiplex is made up of frames each containing four slots each slot relating to a different channel. Preferably there is one bit in each slot and it will be appreciated that this constitutes the bit interleaved version of a time division multiplex. The slot rate is clearly faster than the frame rate. In an example where there are four slots per frame the slot rate is four times the frame rate, e.g. a slot rate of 20 GHz corresponds to a frame rate of 5 GHz . The two input streams are synchronised to one another, i.e. individual slots occur at the same time.

The switching means shown in FIG. 1 comprises two optical AND-gates 13 and 14. Gate 13 has a control port 15 to receive one of the input signals whereas gate 14 has a control port 18 to receive the other. The switch also comprises clock means 10 which generates a pair of complementary clock signals which are synchronised to the input signals and hence to one another. The clock signals use two different wavelengths, hereinafter distinguished as A and B, and they are complementary in that they are formed of pairs of pulses one of each wavelength. Gate 13 receives one of the clock signals at its input port 16 and gate 14 receives the complementary clock signal at its input port 19. The output ports 17 and 20 of the gates 13 and 14 are connected to wavelength sensitive splitters 21 and 22 respectively.

The splitters 21 and 22 are connected to provide signals at wavelength A to terminal 25 and signals at wavelength B to terminal 26. More specifically, the splitters 21 and 22 have A-outputs for wavelength A and B-outputs for wavelength B. The two A-outputs are connected to the two inputs of a junction 23 having its output connected to the terminal 25 and the two B-outputs are connected to the two inputs of a junction 24 having its output connected to the terminal 26.

The operation of the switch will now be described. The AND-gates 13 and 14 provide output only when both the control port and the input port receive optical energy. Under this circumstance the AND-gate passes the clock pulse to output and this output has the same wavelength as the clock pulse. Consider the operation when ports 15 and 18 both receive signal pulses with a clock pulse of wavelength A at port 16. Since the clock signals are complementary, port 19 will receive a clock pulse of wavelength B. The result is that port 17 passes a signal pulse at wavelength A to terminal 25 via splitter 21 and junction 23 and port 20 passes a signal pulse at wavelength B to terminal 26 via splitter 22 and junction 24. In the alternative configuration, port 1 6 receives wavelength B while port 19 simultaneously receives wavelength A. The operation is substantially the same as before but the signal received at port 15 acquires wavelength B so that it goes to terminal 26. Similarly, the signal received at port 18 acquires wavelength A so that it goes to terminal 25. Thus the primary and complementary clock signals control the switching means slot by slot so that a slot received at port 15 is directed to terminal 25 or 26 as required while the slot simultaneously received at port 18 is directed to the other terminal.

The overall performance of the switching means is primarily determined by the slot-by-slot operation described above. Because AND-gates are used the signals at ports 17 and 20 are (partly) controlled by the received traffic. The traffic is modulated by the presence or absence of pulses and this modulation is transferred to the output ports 17 and 20. In addition the signals at each of the terminals 25 or 26 have only one wavelength because the splitters 21 and 22 are wavelength selective. As explained above, it is the traffic which controls the data modulation but it is the clock pulses which affect the pulse wavelength, shape and timing. It will be appreciated that the AND-gates are acting as optical regenerators.

The switching means shown in FIG. 1 redistributes two optical time division multiplexed signals to two terminals, the destination of any pair of input slots being independently controlled by the primary and complementary clock signals. A preferred form of clock will now be described with reference to FIG. 2. This clock is suitable for use as the clock 10 of FIG. 1.

Figure 2:
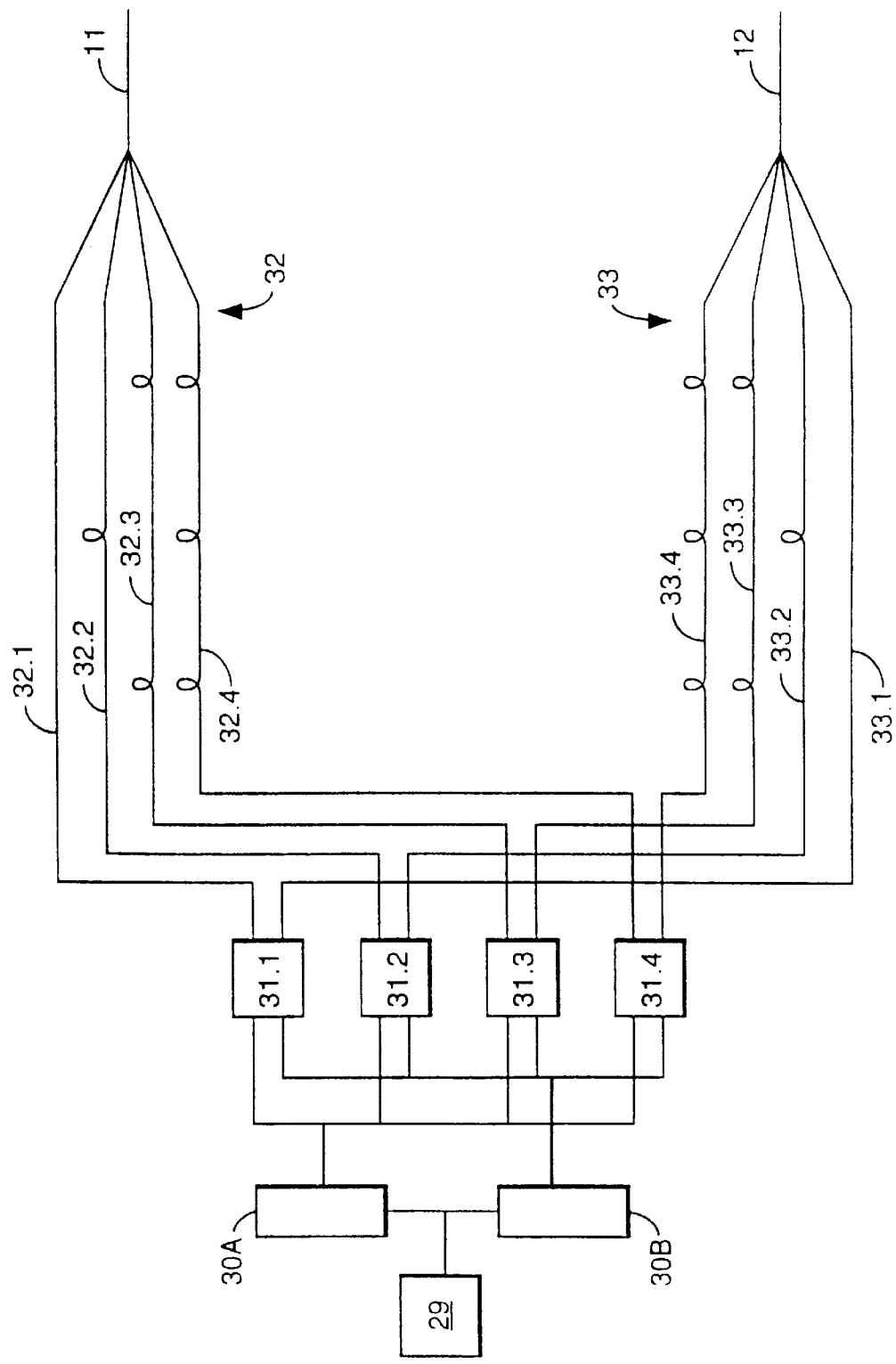
FIG. 2 is a diagram illustrating one form of clock.

The clock illustrated in FIG. 2 includes two lasers 30A and 30B. Laser 30A operates at wavelength A whereas laser B operates at wavelength B. The lasers A and B have a common drive 29 so that they are synchronised. Conveniently, the drive 29 receives a sample of traffic (connections not shown) to facilitate synchronisation. More specifically, each laser produces one pulse per frame of the multiplexed signals. Using splitters, the primary pulses are divided to give one pulse (of each wavelength) per slot. It is emphasised that although each laser only produces one pulse per frame the duration of each pulse is less than the slot duration. On division, the pulses occur simultaneously but the divided pulses are fed to delay lines (32.1–32.4 for the primary clock and 33.1–33.4 for the complementary clock) so that they are separated by the slot interval.

As can be seen from FIG. 2, the clock comprises lasers 30A and 30B as well as a plurality (collectively indicated by the numeral 31) of 2×2 optical switches, i.e. one for each slot. This example assumes four slots per frame so there are four optical 2×2 switches 31.1, 31.2, 31.3 and 31.4. which are associated with frames 1, 2, 3 and 4 respectively. The designation 2×2 specifies that the switch has two optical input ports and two optical output ports. One input signal goes to each of the outputs and when the switch inverts the output signals exchange output ports. Each of the switches 31.1 to 31.4 has one of its input ports connected to laser 30A and its other input port is connected to laser 30B.

The clock also comprises two sets of delay lines generally indicated by numerals 32 and 33. Delay lines 32 provide the primary clock signal and delay lines 33 provide the complementary clock signal. With four slots per frame, each set of delay lines comprises four optical fibres of graded lengths. The grading takes the form of equal length steps each step corresponding to a transmission time equal to the bit period. Set 32 consists of fibres 32.1, 32.2, 32.3 and 32.4 providing the delays needed for slots 1, 2, 3 and 4 in the primary clock signal. Set 33 consists of fibres 33.1, 33.2, 33.3 and 33.4 providing the delays needed for slots 1, 2, 3 and 4 in the complementary clock signal. Each of the switches 31 has one output port connected to a fibre in set 32 and the other output port connected to the corresponding fibre of set 33. Thus, in one configuration, switch 31.1 connects laser A to fibre 32.1 and laser B to fibre 33.1; in its other configuration switch 31.1 connects laser B to fibre 32.1 and laser A to fibre 33.1. Similar connections apply to all the switches 31 and all the fibres 32 and 33.

Because of their stepped lengths, the fibres 32 and 33 delay the pulses so that each clock signal has one pulse in each time slot, the wavelengths of the pulses being determined by the settings of the switches 31. At their output ends, the fibres 32 are connected to fibre 11. Because of the graded delays fibre 11 receives the pulses in sequence, i.e. the primary clock signal is assembled in fibre 11. Similarly, the fibres 33 are connected to fibre 12 where the complementary clock signal is assembled. As stated, the clock of FIG. 2 is suitable for the clock 10 of FIG. 1 and it will be appreciated that it provides the primary and complementary clock signals as described with reference to FIG. 1. Although the combination is not separately illustrated, connecting fibres 11 and 12 of FIG. 2 to AND-gates 13 and 14 of FIG. 1 provides the operation already described.

An alternative configuration, not shown in any drawing, distributes one stream of received traffic to two terminals and refills the empty slots with locally modulated signals. In this modification AND-gate 14 is not needed because there is no traffic for it. It is replaced by a modulator which modulates local data onto the complementary clock signal. The modulator is a modification (not separately illustrated) of the clock shown in FIG. 2. In this modification each of the delay fibres 33 includes its own independent modulator which selectively passes (or fails to pass) clock pulses to modulate local data. Four different data channels can be modulated, i.e. one onto each of fibres 33. It is emphasised that each modulator only operates at the frame rate because the complete clock signal is carried in four parallel fibres. This modulator is connected to a modified FIG. 1 as follows. Fibre is connected to input port 1 6 whereby the input signal is distributed to terminals 25 and 26 as described. There is no input for input port 18 so AND-gate 14 is not needed. Instead, fibre 12 of the (modified) FIG. 2 is connected to splitter 24 of FIG. 1. Fibre 12 carries a locally modulated signal in time division multiplex format. The overall result is that the primary clock divides the input signal between terminals 25 and 26 in accordance with the settings of the switches 31. The complementary clock divides the locally modulated data so as to fill the missing slots.

In a particularly important application only one slot is removed from the (single) input signal. This slot is provided at terminal 26 for demodulation. The other slots are provided to terminal 25 for onward transmission and the missing slot is replaced by a locally modulated signal produced from the complementary clock signals. This requires a combination of the clock of FIG. 2 (as shown) and FIG. 1 modified by the omission of gate 14. A station including this combination is illustrated in FIG. 3.

Figure 3:
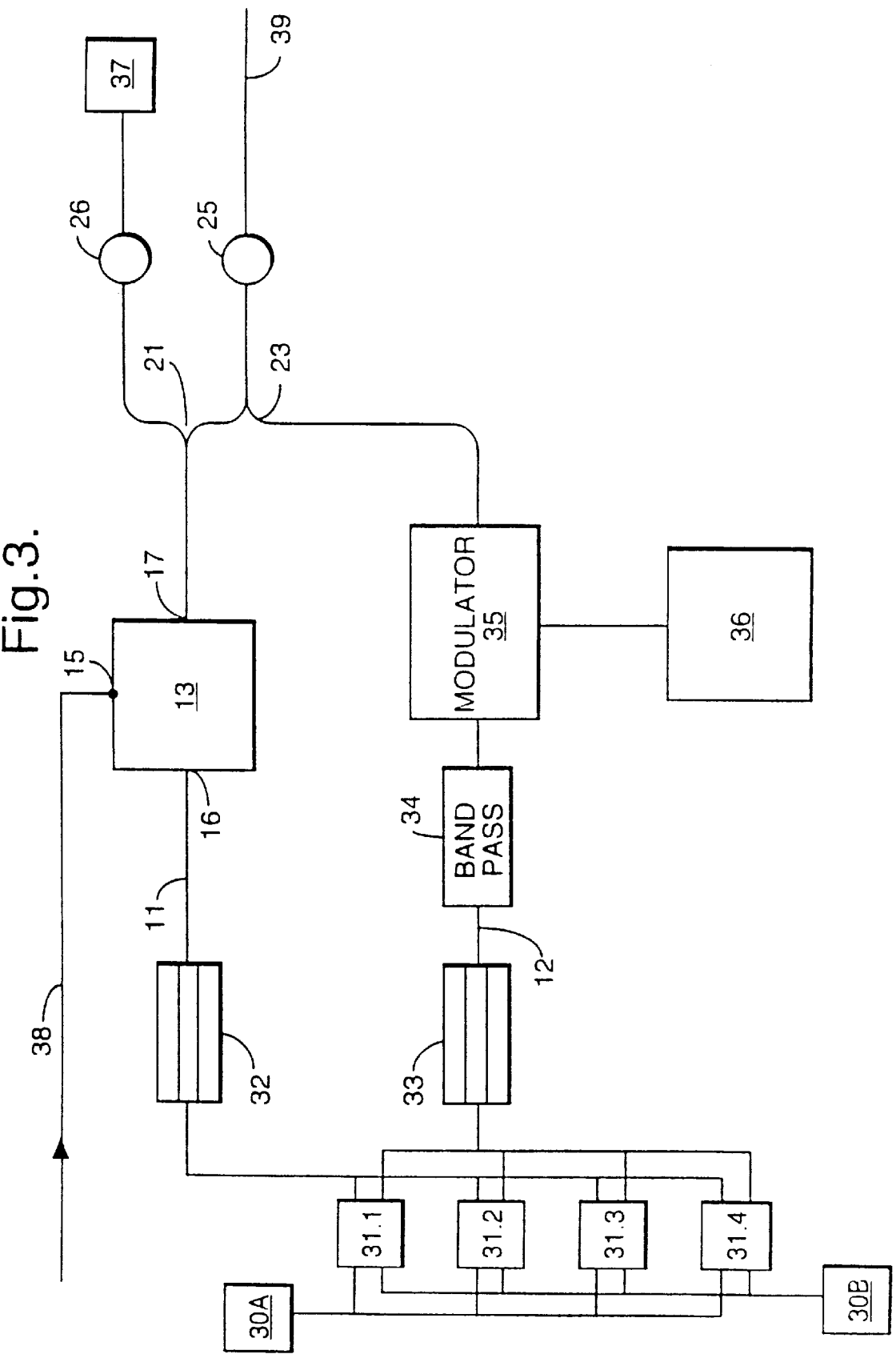
FIG. 3 is a diagram illustrating a preferred embodiment of the invention.

As shown in FIG. 3 the station comprises lasers 30A and 30B and four 2×2 switches 31, each switch being connected to both lasers. Each switch 31 is also connected to a pair of delay fibres, one in set 32 and the other in set 33. Thus, as described in greater detail with reference to FIG. 2, a primary clock signal is provided on fibre 11 and a complementary clock signal is provided on fibre 12.

The station receives traffic, in time division multiplex format (four slots per frame), on transmission fibre 38 which is connected to control port 15 of AND-gate 13. The output port 17 is connected to a wavelength sensitive splitter 21 having an output for wavelength A connected (via junction 23) to a terminal 25 and an output for wavelength B connected to terminal 26. Terminal 25 is connected to demodulator 37 which makes received data available locally. Terminal 25 is connected to transmission fibre 39 for sending traffic to other stations (not shown in FIG. 3). This part of the station is as shown in FIG. 1 and it operates in the same way.

Fibre 12 (which carries the complementary clock signals) is connected, in sequence, to a band pass filter 34 (which passes wavelength A but excludes wavelength B), to a modulator 35, to junction 23 and terminal 25 so that its modulated output is passed to transmission fibre 39. Modulator 35 is controlled by local data source 36.

The station illustrated in FIG. 3 can be used for two-way communication with a partner (not shown). This communication makes use of one channel out of the four of the multiplex format and it is desired to drop this channel for reception and to replace it for transmission. The other channels are regenerated for onward transmission. In order to provide this mode of operation, one channel is selected for "drop and replace". The channel is selected by the settings of the four 2×2 switches. The switch corresponding to the selected channel is set to connect laser 30B to the delay fibres 32 (and laser 30A to the corresponding delay fibre of set 33). All the other 2×2-switches correspond to non-selected channels. All of these are set to connect laser 30A to the delay fibres 32 (and laser 30B to the delay fibres 33.

In operation, the traffic is received at input port 15 via transmission fibre 38 and the non-selected pulses, i.e. pulses in the non-selected channels, coincide with clock pulses having wavelength A (because of the settings of 2×2-switches). Thus these pulses are regenerated as described above and the regenerated pulses have wavelength A whereby they are routed to terminal 25 for onward transmission on transmission fibre 39. For these non-selected pulses the device acts as a regenerator and they pass through without further modification.

In the selected channel, the pulses are regenerated at wavelength B whereby they pass to terminal 26 and to demodulator 37 for local use. In the complementary clock signals, on fibre 12, the selected slot contains wavelength A and these pulses get through band pass filter 34. The non-selected slots contain wavelength B and these pulses are blocked by the band pass filter 34. Thus modulator 35 receives one pulse per frame and this pulse is at wavelength A. Data from 36 is applied and the modulated signals are provided to junction 23 and thence to transmission fibre 39. These pulses are timed to coincide with the gap where the selected regenerated pulse was removed for demodulation. Thus the device provides a "drop and replace" function for one channel which is used locally. The other channels are regenerated.

It is emphasised that gate 13 is the only active component which operates at the bit rate. The lasers 30A and 30B as well as the modulator 35 all operate at the frame rate. The switches 31 remain passive for most of the time. They are only actuated to change the operational configuration and this is infrequent.

It is emphasised that a station does not have to participate the whole time. Each station has a non-participatory mode in which it merely passes on, unchanged, signals which are regenerated. For the non-participatory mode no channel is set to wavelength B; i.e. all the clock pulses have wavelength A; i.e. all the 2×2-switches 31 are set to connect laser 30 to delay lines 32. From the description given above, it will be appreciated that all the received traffic goes to terminal 25 for onward transmission.

Figure 4:
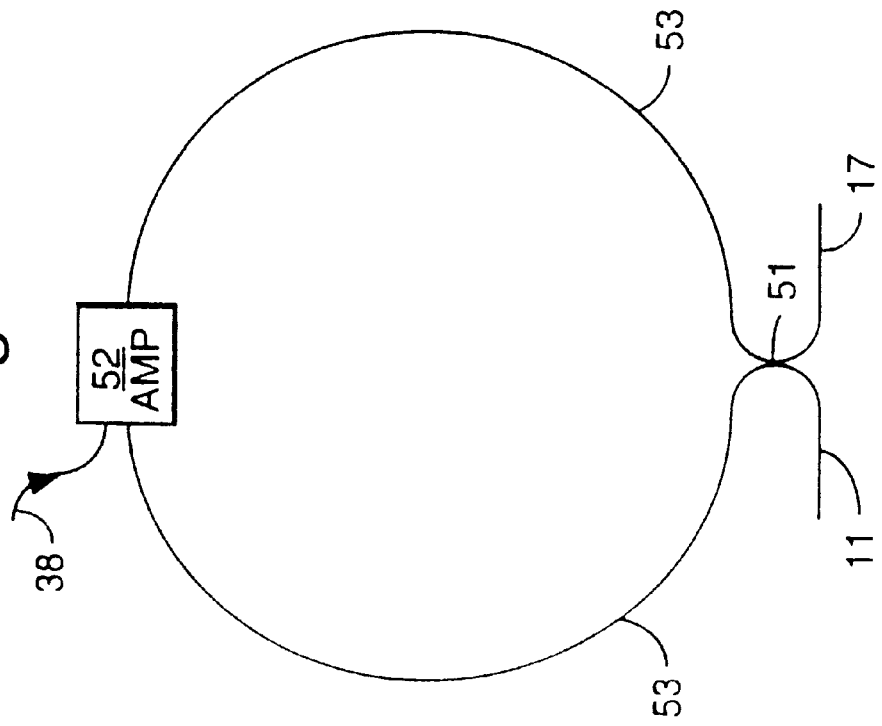
FIG. 4 is a diagram of a modified loop mirror suitable for use as the AND-gates shown in FIGS. 1 and 3.

FIG. 4 shows a loop mirror which is suitable for the AND-gate illustrated in FIG. 1 and 3. As shown in FIG. 4 fibres 11 and 17 are linked into a symmetrical splitter 51 which is connected to the opposite ends of a fibre loop 53. Symmetrically placed in the loop 53 there is a travelling wave semi-conductor laser amplifier 52 which is also connected to receive traffic on fibre 38. In use, clock pulses received on fibre 11 are split into two equal parts by the splitter 51 and caused to travel in opposite directions around the loop 53. Since the amplifier 52 is symmetrically placed the split pulses tend to arrive back at the splitter 51 simultaneously and there is no output on fibre 17. When a traffic pulse is received on fibre 38 the performance of the amplifier 52 is affected and the symmetry is spoiled. The result is that a clock pulse is provided on fibre 17. It will be appreciated that the loop device shown in FIG. 4 meets the requirements of the AND-gates as described above.

Figure 5:
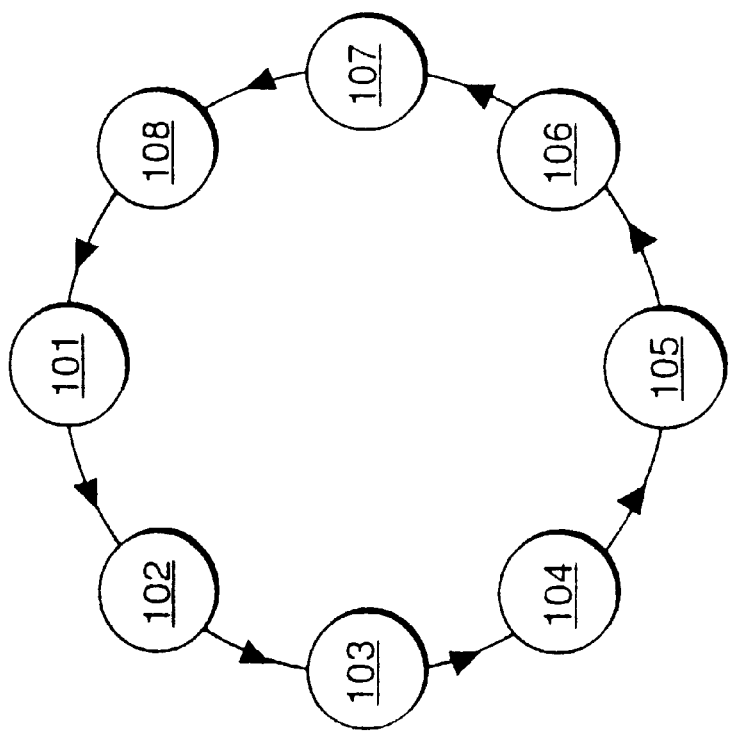
FIG. 5 illustrates a telecommunications system including 8 stations in accordance with invention.

A telecommunications system including 8 stations each as illustrated in FIG. 3 is shown in FIG. 5. The stations, numbered 101 through to 108, are connected into a loop for the anti clockwise propagation of signals as indicated in FIG. 5. The system utilises 4 channels in a time division multiplexed format. Although there are only 4 channels it is possible to have 8 stations because each channel is used for two-way communication, i.e. each channel is used by 2 stations. As has been explained above, any one of the stations 101–108 can be temporarily configured to drop and insert any one of the 4 channels. This makes possible any of the pairings of the stations which, from time to time are needed for communication.

Consider the case where station 101 and station 104 are connected for two-way communication in the first channel. Station 104 selects channel 1 for drop and insert. That is primary clock pulses in channel 1 are given wavelength B and the complementary clock has wavelength A in channel 1. The result is that channel 1 is removed for local use (by station 104) and it is replaced by locally generated signals. These signals are passed via stations 105, 106, 107 and 108 to station 101. Station 101 adopts the same operational mode as station 104 so the signals inserted by station 104 are removed for reception at station 101. At the same time these signals are replaced with data generated at station 101 and passed via stations 102 and 103 to station 104. It can therefore be seen that stations 101 and 104 achieve two-way communication on channel 1 and, although this communication is transmitted via the other stations, the other stations do not interfere with it. It is also clear that the other stations can establish two-way communication, in any combination, using channels 2, 3 and 4 of the time division multiplex format. It will also be realised that any station which, temporarily, has no reception or transmission can adopted the non-participatory format described above.

With four channels it is clear that no more than eight stations can participate at any one time. Nevertheless, more stations than are shown in FIG. 5 can be connected in to the system because it is unlikely that any station will wish to transmit all the time. If more than eight stations are connected it is, of course, necessary that some of them will have to adopt the non-participatory configuration but all the stations can take turns to communicate.

It will be appreciated that the system as a whole may require some form of supervision which is not illustrated in the drawings.

What is claimed is:

1. A clock for generating a primary clock signal synchronised to a secondary clock signal, which clock comprises a primary laser operational at wavelength A and a secondary laser operational at wavelength B, wherein said clock also comprises a primary network of delay channels for producing said primary clock signal and a secondary network of delay channels for producing said secondary clock signal, said clock also comprising a plurality of selector switches, each of each said selector switches having a primary input port connected to the primary laser and a secondary input port connected to the secondary laser and two output ports each connected to a delay channel in the primary network and also to a delay channel in the secondary network whereby each selector switch is connected to a pair of delay channels each member of the pair producing an equivalent delay.

* * * * *